United States Patent
Pan

(10) Patent No.: US 7,610,026 B2
(45) Date of Patent: Oct. 27, 2009

(54) TRANSMITTER NON-DATA-RELATED DIRECT CURRENT (DC) OFFSET CANCELLATION SCHEME

(75) Inventor: Meng-An (Michael) Pan, Cerritos, CA (US)

(73) Assignee: Broadcom Corporation, Irvine, CA (US)

( * ) Notice: Subject to any disclaimer, the term of this patent is extended or adjusted under 35 U.S.C. 154(b) by 474 days.

(21) Appl. No.: 11/503,422

(22) Filed: Aug. 11, 2006

(65) Prior Publication Data
US 2008/0039031 A1    Feb. 14, 2008

(51) Int. Cl.
*H04B 1/04* (2006.01)
(52) U.S. Cl. .................... 455/114.2; 455/115.1; 455/91
(58) Field of Classification Search ......... 455/313–334, 455/130, 91–129, 114.2, 115.1
See application file for complete search history.

(56) References Cited

U.S. PATENT DOCUMENTS

| | | | |
|---|---|---|---|
| 6,826,388 B1 * | 11/2004 | Tanaka et al. ............ | 455/114.1 |
| 6,891,440 B2 * | 5/2005 | Straub et al. .................. | 455/91 |
| 7,085,587 B2 * | 8/2006 | Oono et al. ................. | 455/118 |
| 2006/0057991 A1 * | 3/2006 | Behzad et al. ........... | 455/234.1 |
| 2006/0057999 A1 * | 3/2006 | Behzad et al. .............. | 455/323 |
| 2006/0094395 A1 * | 5/2006 | Lee et al. .................... | 455/333 |

* cited by examiner

*Primary Examiner*—Lana N Le
(74) *Attorney, Agent, or Firm*—Garlick Harrison & Markison; Bruce E. Garlick

(57) ABSTRACT

The present invention provides a transmitter architecture operable to cancel non-data-related direct current (DC) components therein. One method to cancel transmitter non-data-related DC offsets includes generating a baseband digital null signal. Then the digital null signal is converted to a pair of differential analog voltage null signals. The pair of differential analog voltage null signals may be converted to a pair of differential analog current null signals. The pair of differential analog current null signals is provided to a pair of matched impedances to generate a pair of voltage signals across the pair of matched impedances. A voltage offset results from comparing the pair of voltages generated across the pair of matched impedances. Then a current offset is determined based on the voltage offset.

21 Claims, 11 Drawing Sheets

TRANSMITTER NON-DATA-RELATED DIRECT CURRENT (DC) OFFSET CANCELLATION SCHEME

TECHNICAL FIELD OF THE INVENTION

The present invention relates generally to techniques used within wireless communication systems, and more particularly to the cancellation of direct current components within a baseband signal.

BACKGROUND OF THE INVENTION

Communication systems are known to support wireless and wire lined communications between wireless and/or wire lined communication devices. Such communication systems range from national and/or international cellular telephone systems, to the Internet, and to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

To a wireless communication device operating in a receive mode, non-data-related DC components within the received signal may appear as noise. In order to better receive the information intended for the wireless communication device, the wireless communication device must attempt to cancel these components. Prior techniques exist for canceling such interference. However, existing techniques often involve complex or processor intensive operations. Thus, a need exists for improvements in non-data-related DC component cancellation.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGs., like numerals being used to refer to like and corresponding parts of the various drawings.

Figure 1:
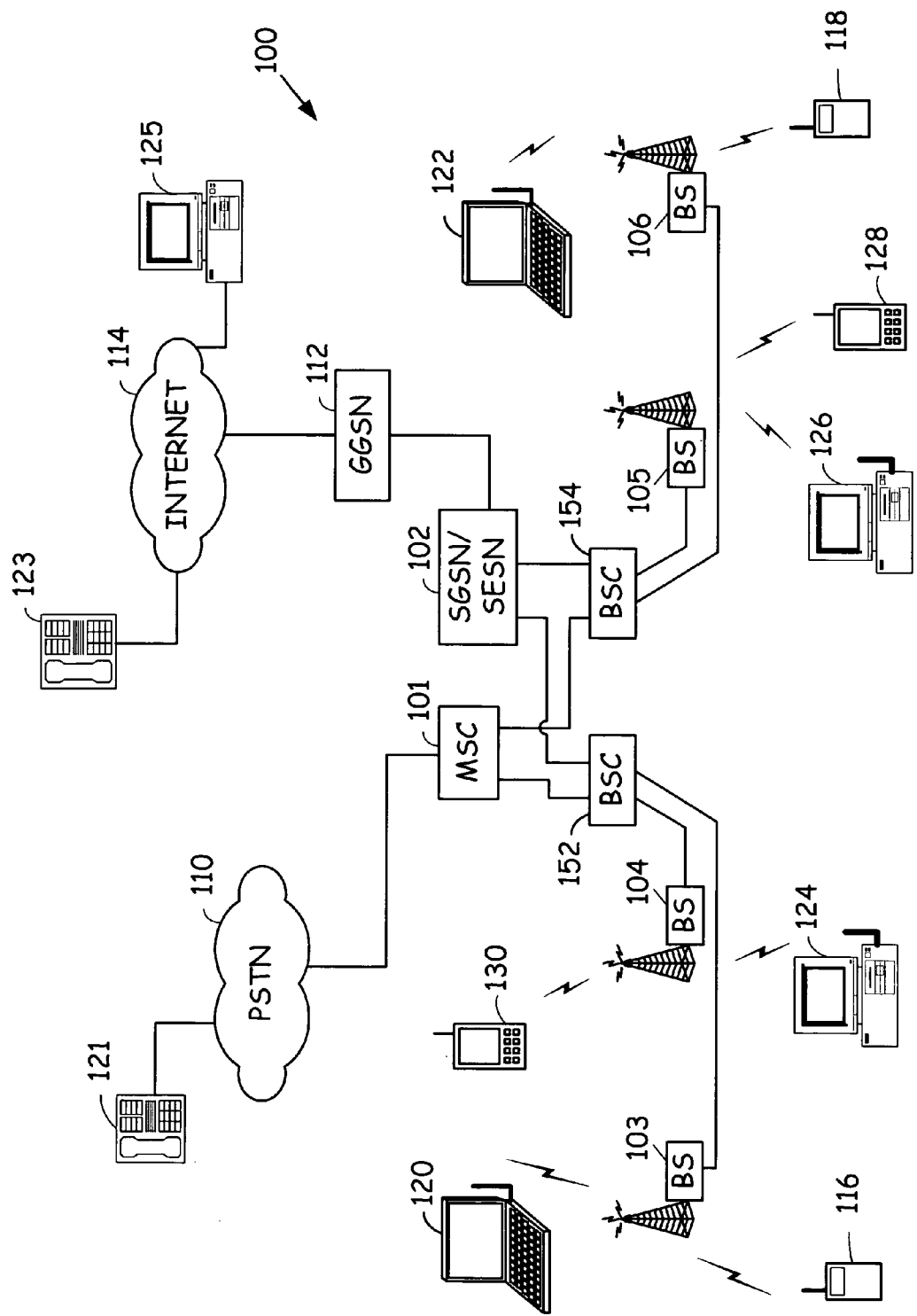
FIG. 1 is a system diagram illustrating a portion of a wireless communication system that supports wireless terminals operating according to the present invention.

FIG. 1 is a system diagram illustrating a portion of a wireless communication system 100 that supports wireless terminals operating in accordance with embodiments of the present invention. Wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links can result in co-channel and adjacent channel signals that may appear as noise which may be colored or white. As previously stated, this noise may interfere with the desired signal of interest. Hence, the present invention provides techniques for canceling such interference in poor signal-to-noise ratio (SNR) or low signal-to-interference ratio (SIR) environments. Additionally, non-data-related direct current (DC) components of the transmitted signals can degrade the performance of individual wireless components as well as the wireless network as a whole.

These wireless links may support digital data communications, VoIP communications, and other digital multimedia communications. The wireless communication system 100 may also be backward compatible in supporting analog operations as well. The wireless communication system 100 may support the Global System for Mobile telecommunications (GSM) standard and also the Enhanced Data rates for GSM (or Global) Evolution (EDGE) extension thereof. The wireless communication system 100 may also support the GSM General Packet Radio Service (GPRS) extension to GSM. However, the present invention is also applicable to other standards as well, e.g., 802.11 a/g, TDMA standards, CDMA standards, etc. In general, the teachings of the present invention apply to digital communication techniques that address the identification and cancellation of interfering communications.

Wireless terminals 116, 118, 120, 122, 124, 126, 128, and 130 couple to the wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard. These wireless terminals 116-130 also support the GSM standard and may support the GPRS standard.

Figure 2:
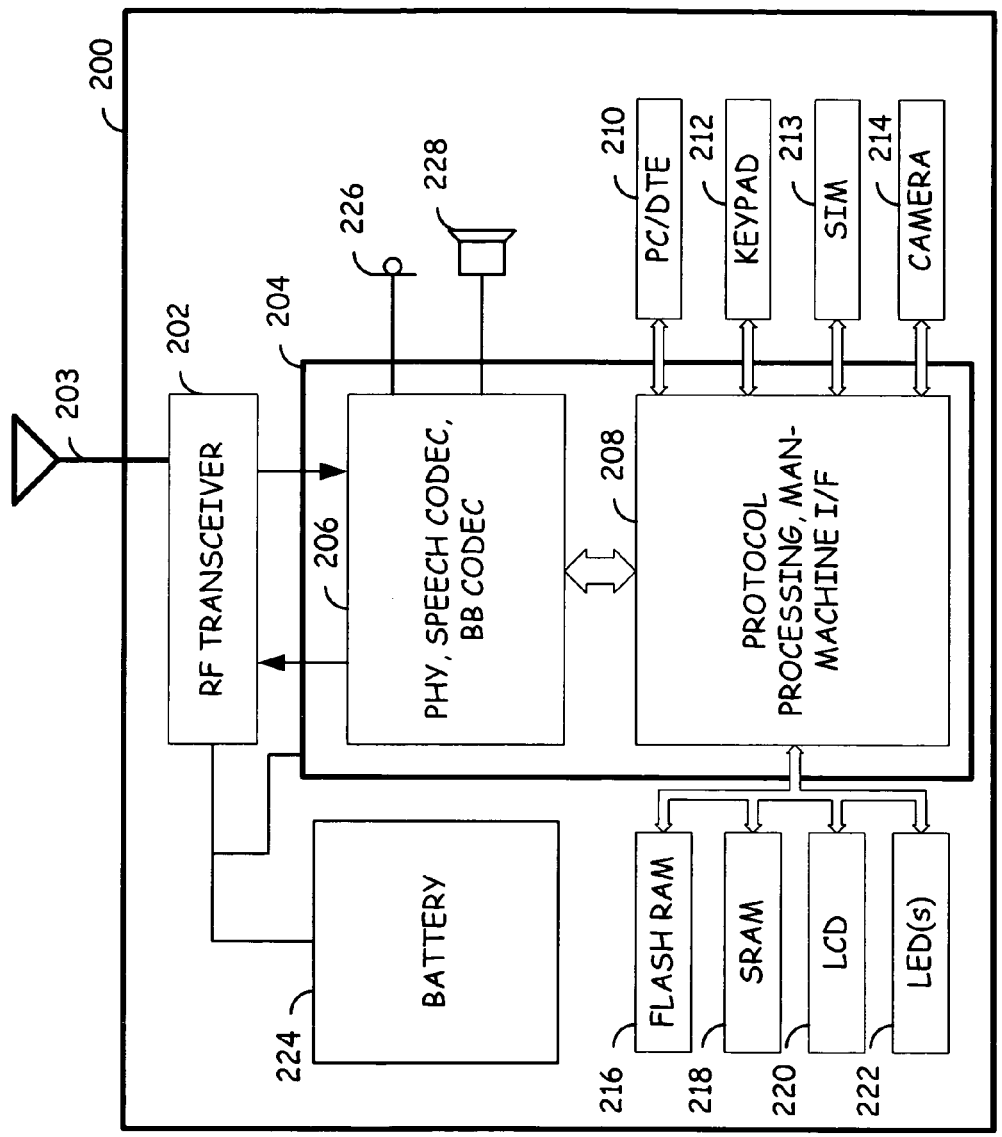
FIG. 2 is a block diagram functionally illustrating a wireless terminal constructed according to the present invention.

FIG. 2 is a block diagram functionally illustrating wireless terminal 200. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

RF transceiver 202 couples to an antenna 203, to the digital processing components 204, and also to battery 224 that powers all components of wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to various components such as, but not limited to, Personal Computing/Data Terminal Equipment interface 210, keypad 212, Subscriber Identification Module (SIM) port 213, a camera 214, flash RAM 216, SRAM 218, LCD 220, and LED(s) 222. When camera 214 and LCD 220 are present, these components may support either/both still pictures and moving pictures. Thus, the wireless terminal 200 of FIG. 2 may be operable to support video services as well as audio services via the cellular network.

Figure 3:
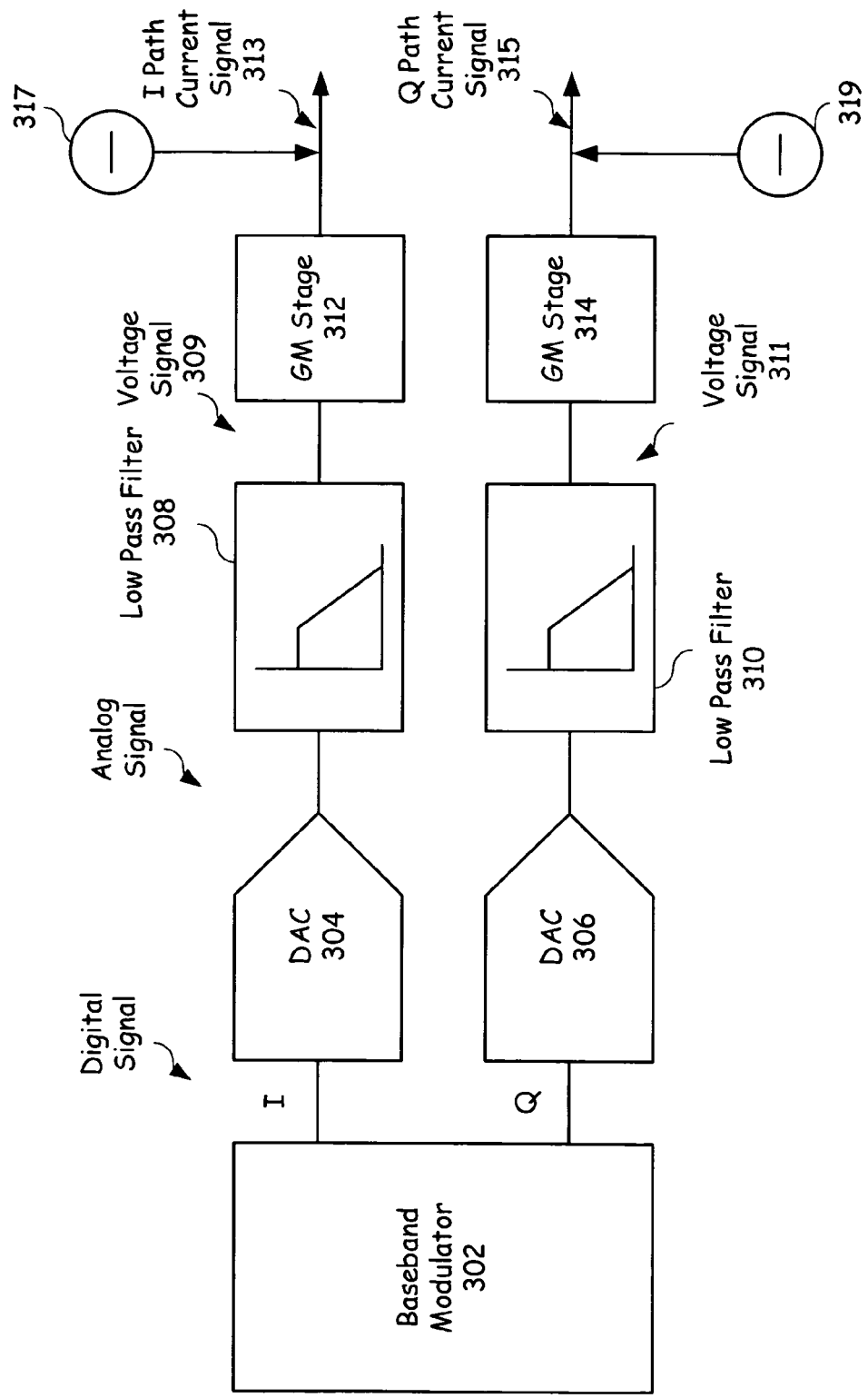
FIG. 3 depicts a transmitter architecture within an RF transceiver in accordance with embodiments of the present invention.

FIG. 3 depicts a transmitter architecture within an RF transceiver, such as RF transceiver 202, in accordance with embodiments of the present invention. This transmitter architecture includes a baseband modulator 302, and an in-phase (I) path and a quadrature (Q) path. The I path includes a digital analog converter (DAC) 304, low pass filter 308, GM Stage 312, and offset current source 317. The Q path includes DAC 306, low pass filter 310, GM Stage 314, and offset current source 319. Baseband modulator 302 provides a digital I and Q signal to DAC 304 and 306 respectively. DAC 304 and 306 produced an analog signal which is operated on by low pass filters 308 in the I path and 310 of the Q path. This results in a voltage signal 309 and 311 for I and Q path respectively. This voltage signal is provided to GM Stage 312 and 314 where the GM Stages convert the voltage signal to current signals 313 and 315 which may be provided to the up conversion mixers.

Figure 4:
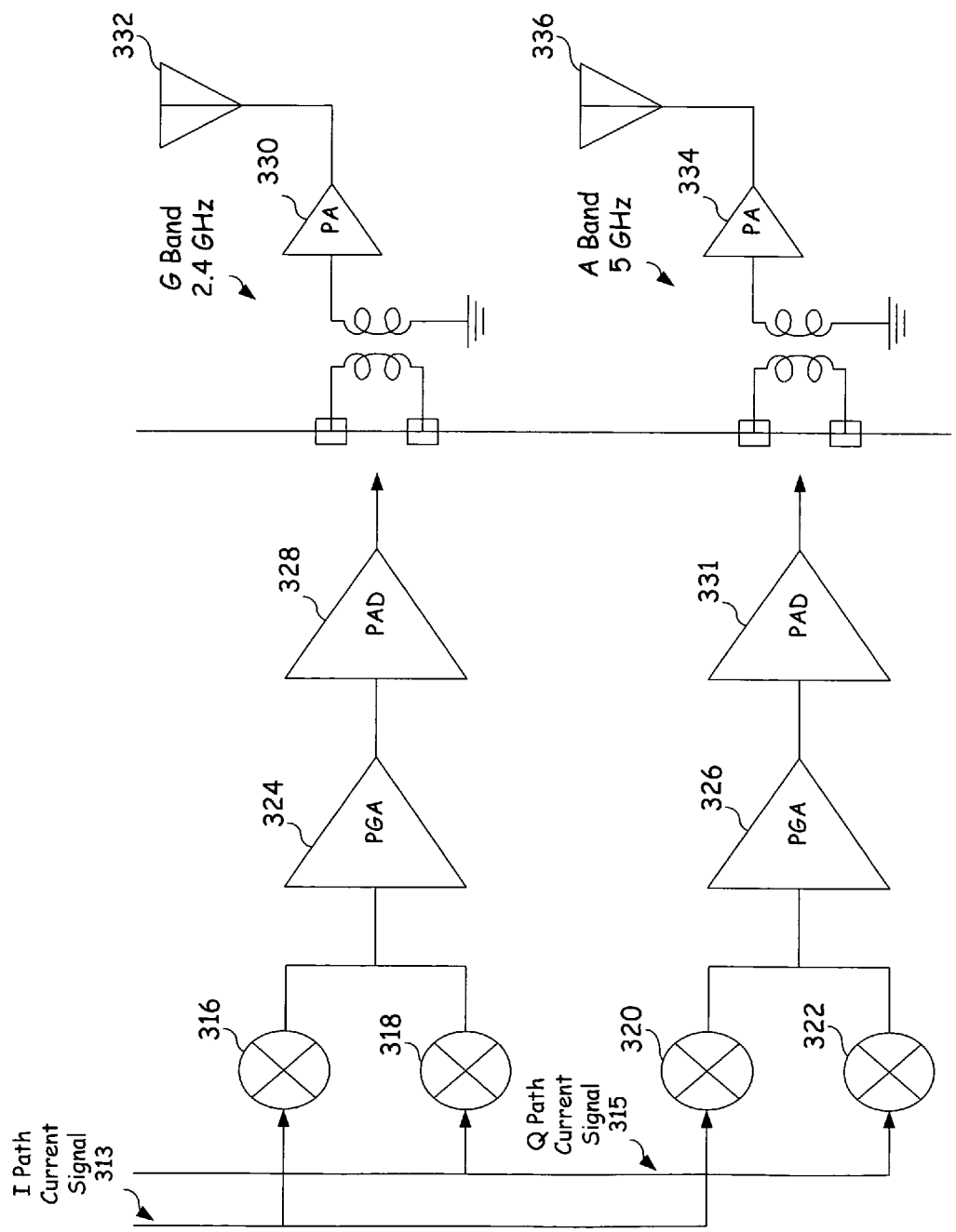
FIG. 4 depicts a circuit to mix, up convert and transmit the baseband signal in accordance with embodiments of the present invention.

The I and Q signals, signals 313 and 315, provided by the GM Stages may be provided to a 802.11.G transmitter or an 802.11.A transmitter depending on the mode of operation. FIG. 4 depicts a circuit to mix, up convert and transmit the baseband signal. When in the 802.11 G mode of operation, the upper pathway of FIG. 4 is used and will be discussed. I signal 313 and Q signal 315 are provided to up conversion mixers 316 and 318. The output signals provided by up conversion mixers 316 and 318 are provided to programmable gain amplifier (PGA) 324. The output of PGA 324 is provided to PA driver 328. This PA driver may be used to drive antenna functions associated with PA 330 used to transmit the RF signal based on the up converted I signal 313 and Q signal 315 via antenna 332 when operating in the G mode.

The lower pathway functions similarly to the G mode of operation, but operates at 5 gigahertz (GHz) versus 2.4 GHz. This lower path includes up conversion mixers 320 and 322 which receive I and Q signals 313 and 314 respectively. The up converted mixed signals are provided to PGA 326. The output of PGA 326 is in turn provided to PA driver 331. This PA driver may be used to drive antenna functions associated with PA 334 used to transmit the RF signal when operating in the A mode using antenna 336.

Figure 5:
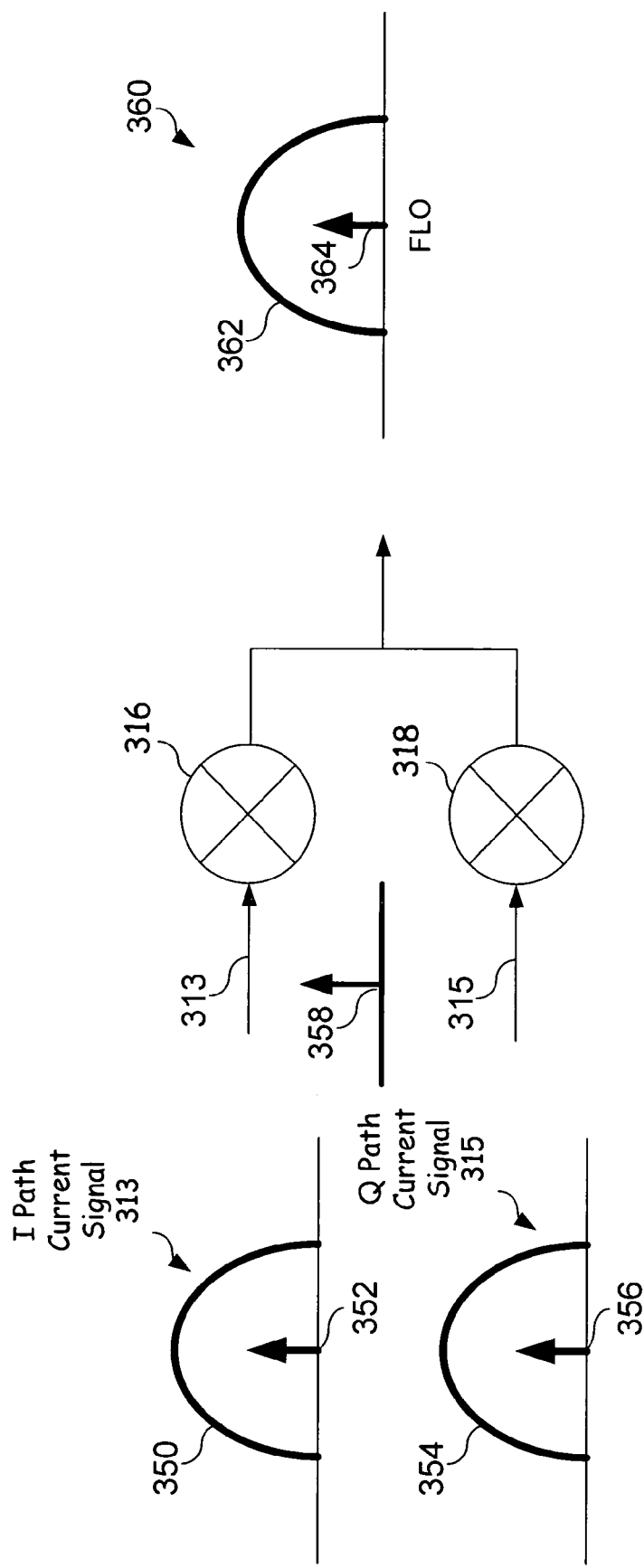
FIG. 5 depicts a problem associated with the previous transmitter architectures.

FIG. 5 depicts a problem associated with the transmitter architectures as described. As shown in the left portion of FIG. 5, I signal 313 may include both a modulated signal 350 and a non-data-related DC component 352. Q signal 315 includes a modulated component 354 and non-data-related DC component 356. Up conversion mixers 316 and 318 (G mode) or 320 and 322 (A mode) receive I signal 313 and Q signal 315 and mix I signal 313 and Q signal 315 with RF tone 358. This results in an RF signal 360 which includes a modulated signal 362 and the up converted non-data-related DC component 364 located at the frequency of tone 358. Thus, as shown here in FIG. 5 the base band signal 313 and 315 is up converted to an RF signal 360. However, unwanted non-data-related DC component 364 (LO leakage) has been up-converted as part of the RF signal 360. This degrades the transmission error vector magnitude (EVM) performance. This transmitter EVM may be used to describe the transmitter quality.

The embodiments of the present invention differ from prior techniques that have compensated for LO leakage. Referring to FIG. 3, embodiments of the present invention generate a digital zero (null) signal with baseband modulator 302. This digital zero has both an I and Q component where the I and Q components are provided to DAC 304 and 306 respectively. This results in an analog null signal representing zero as the output of DAC 304 and 306. Any mismatch in the following circuits, (i.e. DAC, low pass filters, GM Stage) will add a DC component to I signal 313 and Q signal 315. For illustration purposes the following equations are used to describe the I path signals when implemented using differential signals.

$$IP=DC+0.5*A*\cos(wt+phase)$$

$$IN=DC-0.5*A*\cos(wt+phase)$$

where ideally:

$$I=IP-IN=A*\cos(wt+phase)$$

The low pass filter or GM stage may add a DC component to the differential signals. However, these DC components will not exactly match as will be discussed. These equations are ideally represented as follows:

$$IP=DC+0.5*A*\cos(wt+phase)$$

$$IN=DC-0.5*A*\cos(wt+phase)$$

where again ideally:

$$I=IP-IN=A*\cos(wt+phase)$$

Figure 6:
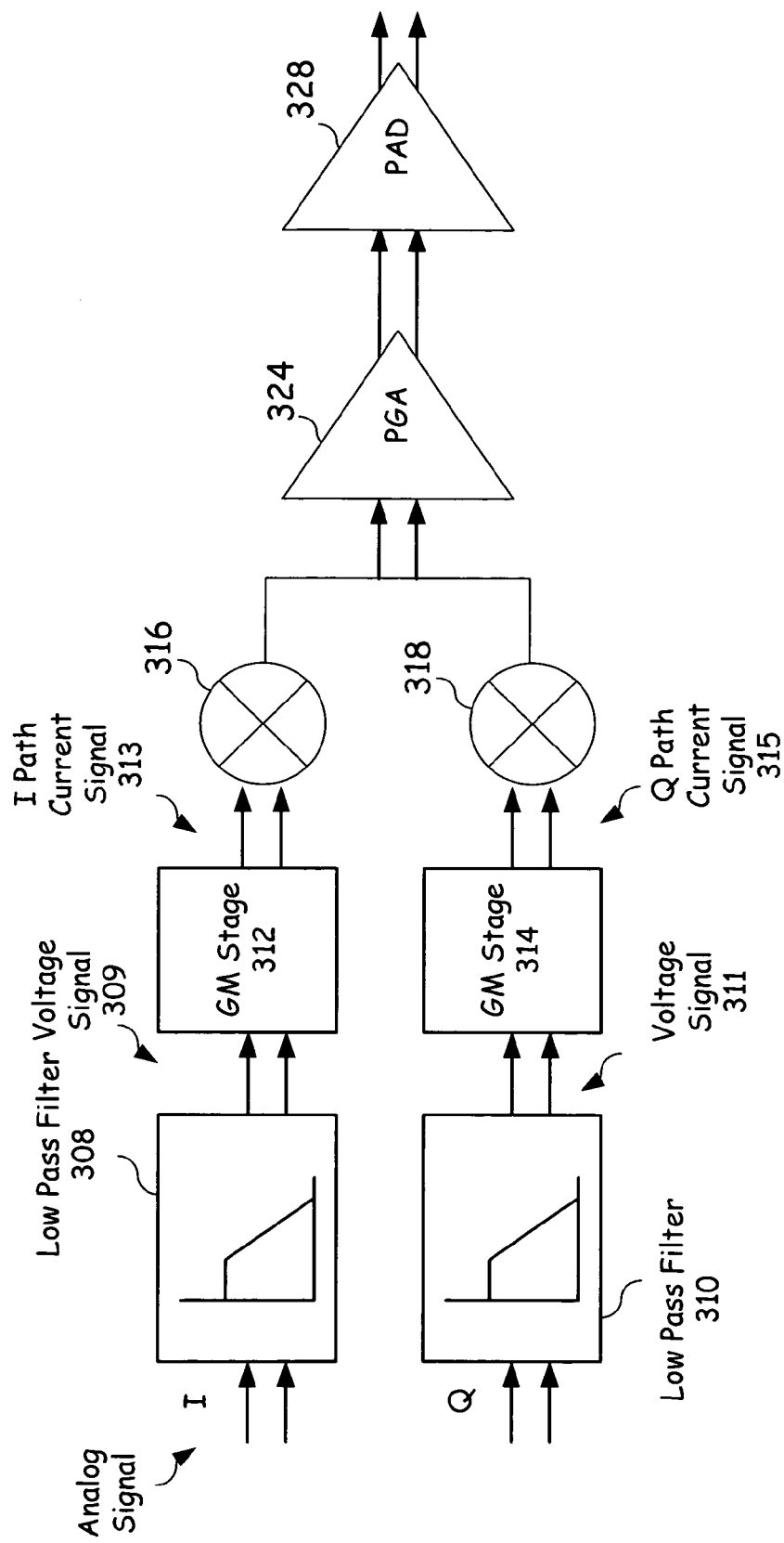
FIG. 6 depicts a transmitter architecture's analog functional blocks located before the up conversion mixers.

However, this requires that the non-data-related DC components of the differential signals match perfectly. Any non-perfect match will result in a non-data-related DC component. FIG. 6 depicts transmitter architecture's analog functional blocks located before the up conversion mixers 316, 318, 320, 322. The analog signal for the I and Q path outputted by DAC 304 and 306 may be implemented using differential signals. The above equation ideally show that if there is a zero input signal there is a zero output signal and this is a linear system.

However if devices inside the analog blocks are not perfectly matched, the differential lines will have unique non-data-related DC components. The following equations more accurately describe this situation.

$$IP=DC1+0.5*A*\cos(wt+phase)$$

$$IN=DC2-0.5*A*\cos(wt+phase)$$

Where:

$$I=IP-IN=error+A*\cos(wt+phase)$$

Using the equations provided above, a zero input results in a non-zero (error) output that may be up-converted to RF. The error information is introduced into the frequency domain and up-converted when the analog devices are not perfectly matched. Prior to up-conversion this error is called a non-data-related DC offset in the baseband. After up-conversation this is called local oscillator (LO) leakage in RF.

Figure 7:
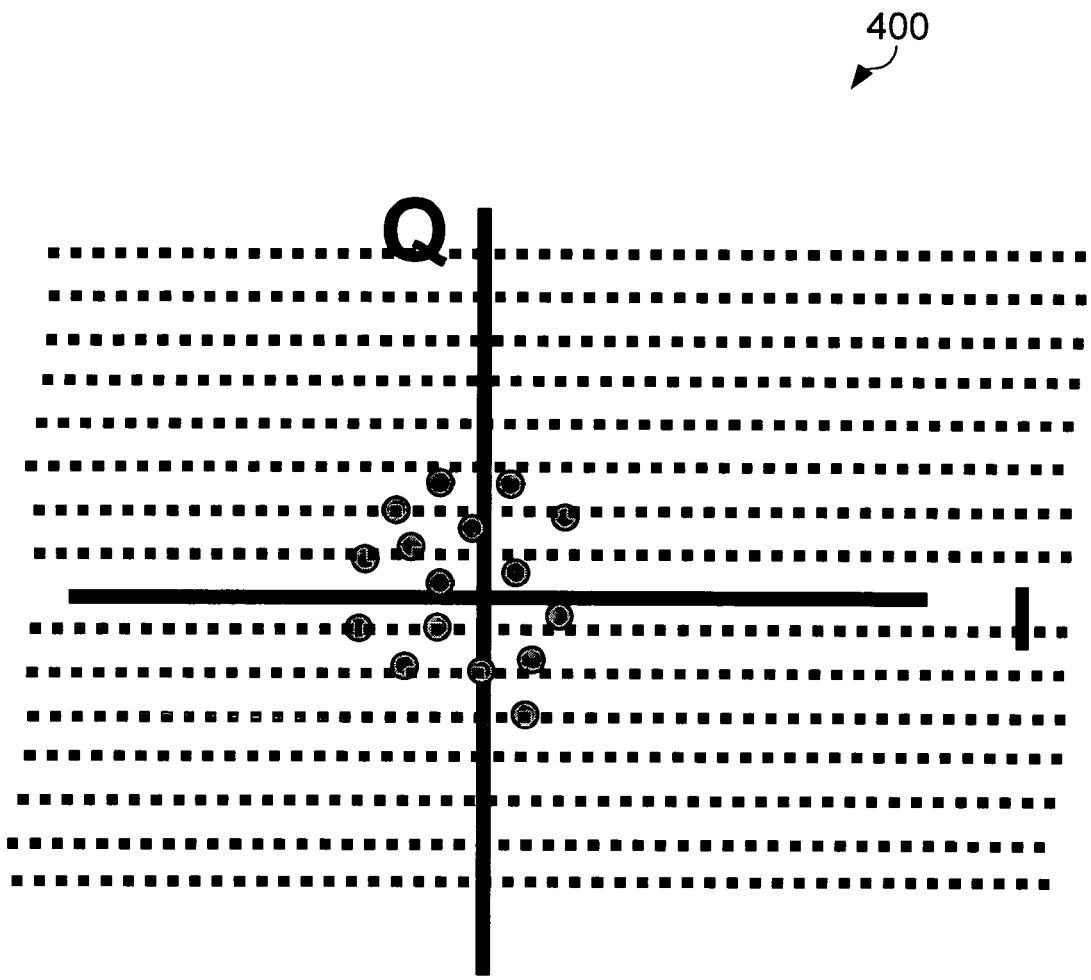
FIG. 7 depicts a problem as a baseband constellation associated with the previous transmitter architectures and substantially addressed by embodiments of the present invention.

FIG. 7 shows this error in baseband where X axis is associated with I path and the Y axis is associated with the Q path. Constellation 400 in FIG. 7 shows that the DC bias for the I and Q path may differ and will result in an up-converted non-data-related DC error. A conventional way of addressing this issue is to reduce the non-data-related DC component 352 and 356, shown previously in FIG. 5, by designing a low mismatched analog circuit before mixers 316, 318, 320 and 322. However this low mismatch means a large device or a large area device. Unfortunately as the area of the device goes up the associated cost of the device goes up as well.

Figure 8:
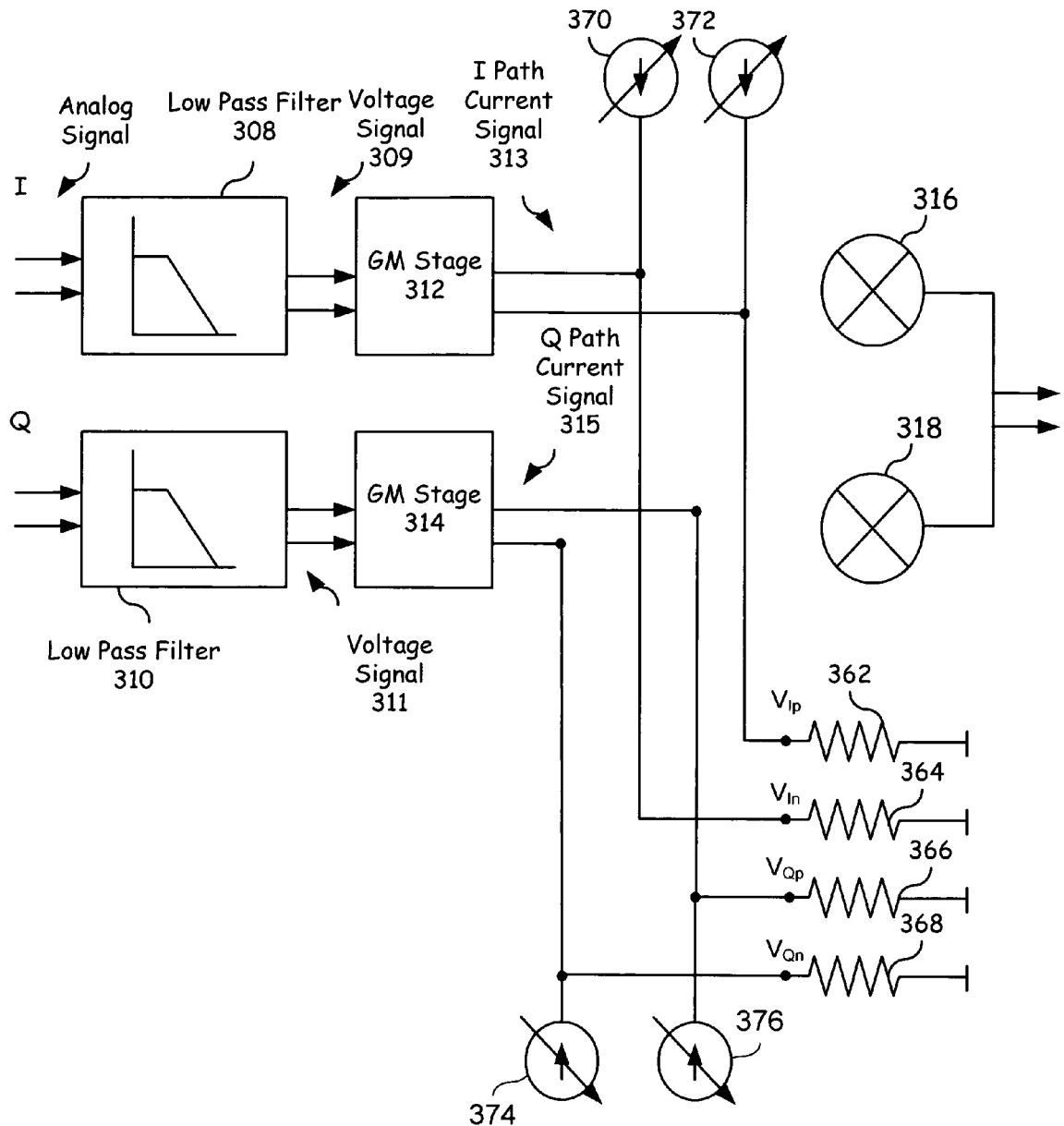
FIG. 8 depicts a system operable to address the non-data-related DC offset issue in accordance with embodiments of the present invention.
Figure 9:
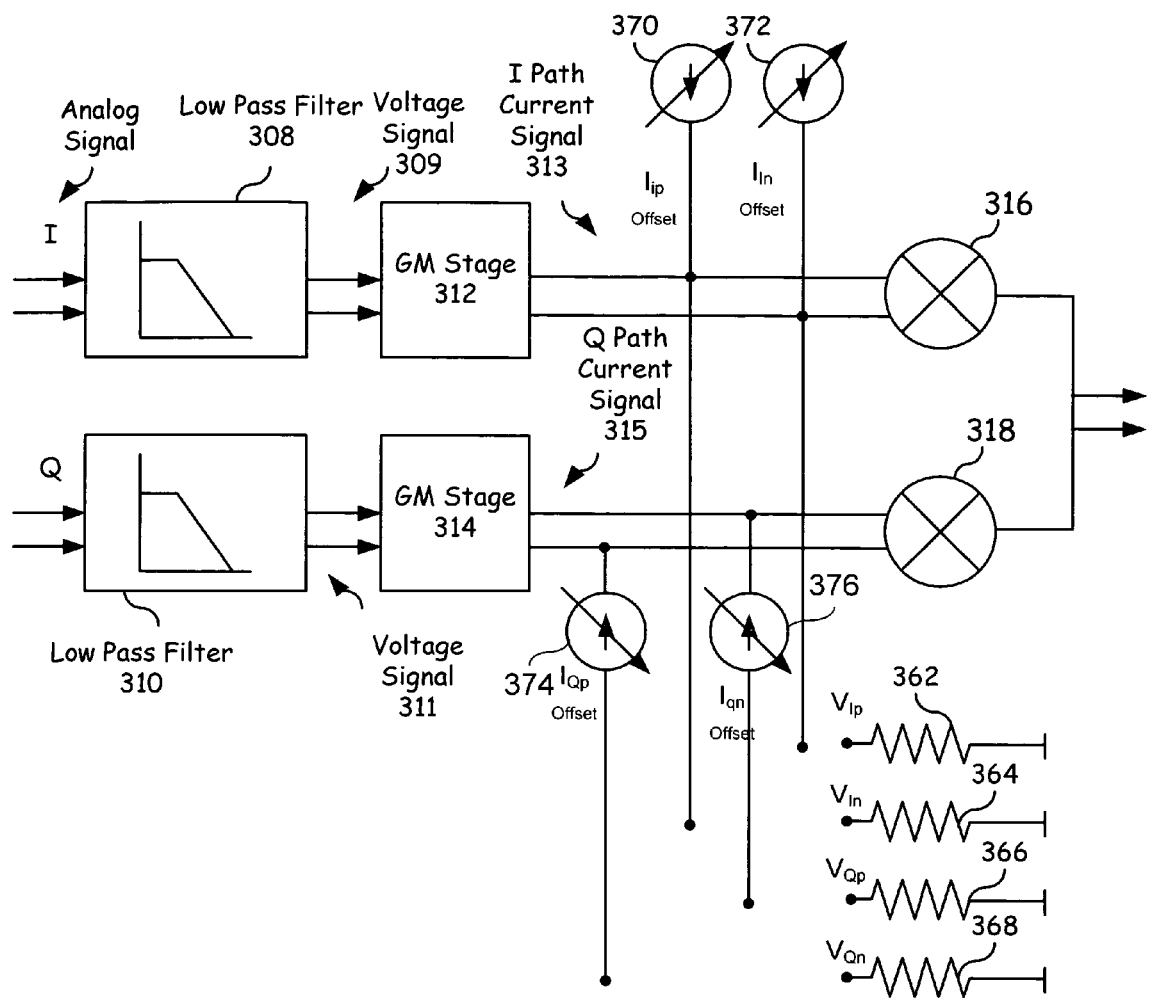
FIG. 9 depicts a system operable to address the non-data-related DC offset issue in accordance with embodiments of the present invention.

Another conventional solution utilizes a single tone at baseband frequency used for calibration. This allows a processing system to determine the LO component by either capturing the RF wave form using an envelope detector or down conversion mixer. Then this non-data-related DC current may be fed into the I and Q path until the LO tone is reduced to an acceptable level. However this involves significant processing time and DSP operation FIG. 8 depicts a system operable to address the non-data-related DC offset issue in accordance with embodiments of the present invention. GM stages 312 and 314 of FIG. 3, as previously stated, convert an input voltage signal supplied as the output signal from low pass filter 310 and 308 into current signals 313 and 314. However, in FIG. 8, the output of GM stage 312 and 314 is not coupled to up-conversion mixers but rather matched impedances 362, 364, 366 and 368. When the output of GM stage 312 and 314 is not coupled to the up-conversion mixers, the current signals, I signal 313 and Q signal 315, generated by GM stage 312 and 314 are forced to flow to an alternative current path such as the current path provided by the matched impedances. The voltage measured across these impedances will be $V_{Ip}$, $V_{In}$, $V_{Qp}$ and $V_{Qn}$ respectively. By comparing the voltages of these matching impedances it is possible to determine which has a higher or lower DC value. The current source 370, 372, 374 and 376 may then be used to generate a cancellation current or an offset current denoted in FIG. 9 as $I_{Ip\ offset}$, $I_{In\ offset}$, $I_{Qp\ offset}$ and $I_{Qn\ offset}$. The current source may adjust the current offsets until the voltage $V_{Ip}=V_{In}$ and $V_{Qp}=V_{Qn}$. This results in a non-data-related DC offset substantially equal to zero. Depending on the computing power that is available the $I_{Ip\ offset}$, $I_{In\ offset}$, $I_{Qp\ offset}$ and $I_{Qn\ offset}$ currents may be calculated simultaneously otherwise they may be calculated in series.

Following this calibration the circuit path to impedances 362, 364, 366 and 368 may be opened forcing the offset currents to flow into the I and Q path. Thus the $I_{Ip\ offset}$, $I_{In\ offset}$, $I_{Qp\ offset}$ and $I_{Qn\ offset}$ currents will mix with the appropriate $I_{Ip}$, $I_{In}$, $I_{Qp}$ and $I_{Qn}$ current signal supplied by GM stage 312 and 314 respectively. By mixing the offset current with the output of the GM stage the non-data-related DC offset is effectively canceled and no non-data-related DC offset is up-converted by the up-conversion mixers. Thus there is no LO leakage from the RF side.

Figure 10:
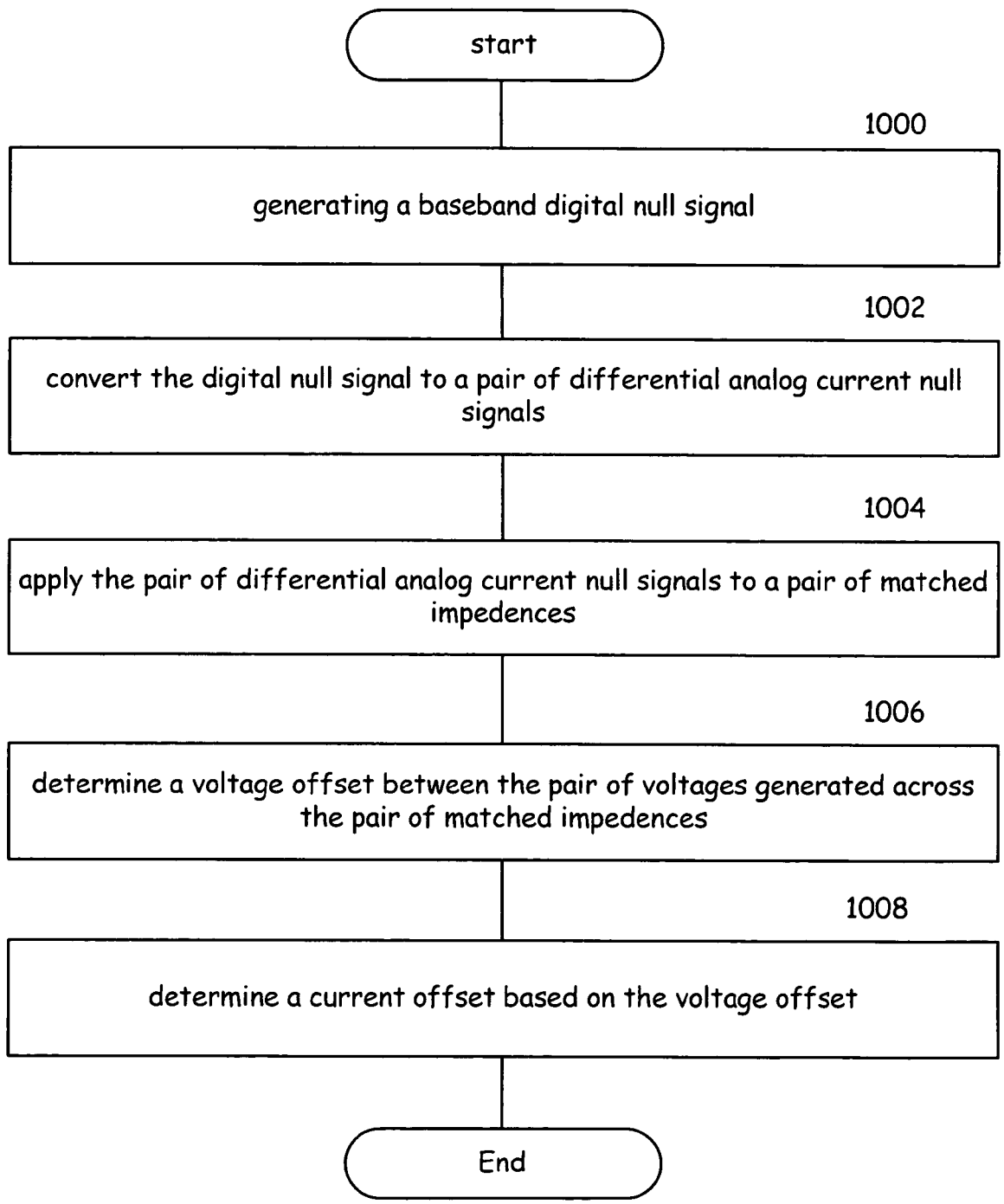
FIG. 10 provides a logic flow diagram that provides a method to cancel non-data-related direct current (DC) components in accordance with an embodiment of the present invention.

FIG. 10 provides a logic flow diagram in accordance with embodiments of the present invention. Specifically, FIG. 10 provides a method to determine a direct current offset within a baseband signal. This begins by in Step 1000 by generating a baseband digital null signal. In Step 1002, the baseband digital null signal may be converted to a pair of differential analog current null signals. This conversion to an analog current null signal may be a two-step process. For example, the baseband digital null signal may be first converted to an analog voltage signal which is then in turn converted to an analog current signal. Additional processing steps may apply a low pass filter to the analog voltage signal in order to facilitate the removal of DC content within the baseband signal. In Step 1004 the pair of differential analog current null signals may be applied to a pair of matched impedances.

Applying these currents to a pair of matched impedances will generate a pair of voltages. Any difference between the voltages may be due to errors that would contribute to the non-data-related DC component of the baseband analog signal. In Step 1008 a current offset may be determined based on the voltage offset. This current offset may then be applied to non-null baseband signals in order to remove non-data-related DC components of the baseband signals prior to up converting and transmitting an RF signal based on the baseband signal. The digital null signal, differential analog current null signals, the baseband signals both analog and digital include both in phase (I) components and quadrature (Q) components. These I and Q paths and their individual differential signal pathways may each have separate non-data-related DC offsets. This may require the processes of Steps 1000 through 1008 to be performed for both the I component and the Q component. Depending on the processing abilities of the terminal of the transmitter, the determination of the current offsets may be performed in series or in parallel.

Figure 11:
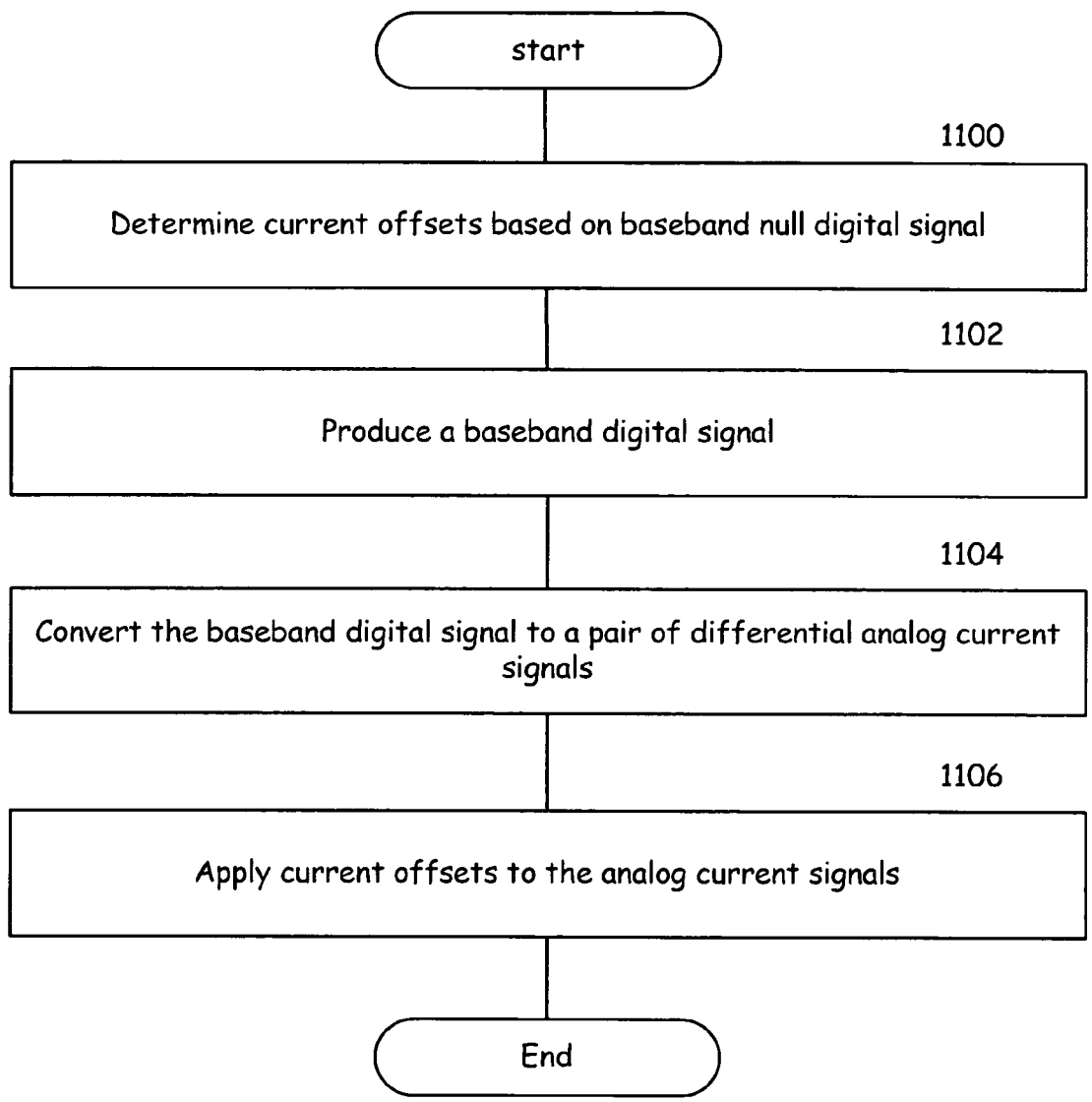
FIG. 11 provides a second logic flow diagram that provides a method to cancel non-data-related direct current (DC) components in accordance with an embodiment of the present invention.

FIG. 11 provides a logic flow diagram that depicts how the non-data-related DC component may be removed from a baseband signal prior to up converting the baseband signal and transmitting an RF signal based on the baseband signal. This involves in Step 1100 determining current offsets based on the baseband null digital signal. This may be performed using a process such as that described with respect to FIG. 10 and/or the apparatuses, the systems, described with respect to FIG. 3-FIG. 9. After the current offsets have been determined in Step 1100 a baseband digital signal may be produced in Step 1102. This baseband digital signal may be converted to a pair of differential analog current signals in Step 1104. As previously stated, this may be a two-step process where the baseband digital signal is first converted to a voltage signal and then converted to a current signal. Additionally, the signal may be filtered using a low pass filter or other like filter to remove some DC components from the baseband analog current signal. The current offsets determined in Step 1100 may then be applied to the baseband analog current signals in order to cancel the non-data-related DC offsets contained therein.

The above described calculations and processes may be executed within the baseband processor, a non-data-related DC offset processing module or within a bandgap calibration circuit. Such a bandgap calibration circuit is disclosed in U.S. patent application Ser. No. 10/460,578 entitled "MULTI-MODE BAND-GAP CURRENT REFERENCE," which is incorporated by reference in its entirely for all purposes. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 32 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in FIGS. 10 and 11.

In summary, embodiments of the present invention provide a transmitter architecture operable to cancel non-data-related direct current (DC) components therein. One method to cancel transmitter non-data-related DC offsets includes generating a baseband digital null signal. Then the digital null signal is converted to a pair of differential analog voltage null signals. The pair of differential analog voltage null signals may be converted to a pair of differential analog current null signals. The pair of differential analog current null signals is provided to a pair of matched impedances to generate a pair of voltage signals across the pair of matched impedances. A voltage offset results from comparing the pair of voltages generated across the pair of matched impedances. Then a current offset is determined based on the voltage offset.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

What is claimed is:

1. A method to cancel transmitter non-data-related direct current (DC) offsets comprising:

generating a baseband digital null signal;

converting the digital null signal to a pair of differential analog voltage null signals;

converting the pair of differential analog voltage null signals to a pair of differential analog current null signals;

applying the pair of differential analog current null signals to a pair of matched impedances to generate a pair of voltage signals across the pair of matched impedances;

determining a voltage offset between the pair of voltages generated across the pair of matched impedances; and determining a current offset based on the voltage offset.

2. The method of claim 1, wherein the digital null signal comprises an in-phase (I) component and a quadrature (Q) component wherein the I component and the Q component have separate non-data-related DC offsets.

3. The method of claim 2, wherein I component non-data-related DC offset and the Q component non-data-related DC offset are determined in series.

4. The method of claim 2, wherein I component non-data-related DC offset and the Q component non-data-related DC offset are determined in parallel.

5. The method of claim 1, further comprising:

producing a baseband digital signal;

converting the baseband digital signal to a pair of differential analog voltage signals;

converting the pair of differential analog voltage signals to a pair of differential analog current signals;

applying the current offset to the pair of analog current signals.

6. The method of claim 5, further comprising up converting the pair of analog current signals to produce an RF signal.

7. The method of claim 6, wherein the RF signal is an 802.11 compliant signal.

8. The method of claim 1, further comprising low pass filtering the differential analog voltage null signals and differential analog voltage signals.

9. A wireless terminal that comprises:

a Radio Frequency (RF) front end operable to receive RF burst(s);

a baseband processor operable to output a baseband digital null signal;

a digital to analog converter (DAC) operable to convert the baseband digital signal to a baseband analog voltage signal;

a GM stage operable to convert the baseband analog voltage signal to a baseband analog current signal;

a non-data-related DC offset processing module to determine an offset current based on the null signal; and an offset current source operable to apply the offset current to the baseband analog current signal wherein the offset current is operable to cancel a non-data-related direct current (DC) component of the baseband analog current signal.

10. The wireless terminal of claim 9, wherein the baseband digital signal, baseband analog voltage signal, and baseband analog current signal comprise an in-phase (I) component and a quadrature (Q) component wherein the I component and the Q component have separate non-data-related DC offsets.

11. The wireless terminal of claim 10, wherein I component offset current and the Q component offset current are determined in series.

12. The wireless terminal of claim 10, wherein I component offset current and the Q component offset current are determined in parallel.

13. The wireless terminal of claim 9, further comprising an RF back end operable to up convert a non-data-related DC offset baseband signal and transmit an RF signal based on the non-data-related DC offset baseband signal.

14. The wireless terminal of claim 13, wherein the RF signal is an 802.11 compliant signal.

15. A method to cancel transmitter non-data-related direct current (DC) offsets comprising:

generating a baseband digital null signal;

converting the digital null signal to a pair of differential analog voltage null signals;

converting the pair of differential analog voltage null signals to a pair of differential analog current null signals;

applying the pair of differential analog current null signals to a pair of matched impedances to generate a pair of voltage signals across the pair of matched impedances;

determining a voltage offset between the pair of voltages generated across the pair of matched impedances;

determining a current offset based on the voltage offset;

producing a baseband digital signal;

converting the baseband digital signal to a pair of differential analog voltage signals;

converting the pair of differential analog voltage signals to a pair of differential analog current signals; and applying the current offset to the pair of analog current signals.

16. The method of claim 15, wherein the digital null signal comprises an in-phase (I) component and a quadrature (Q) component wherein the I component and the Q component have separate non-data-related DC offsets.

17. The method of claim 16, wherein I component non-data-related DC offset and the Q component non-data-related DC offset are determined in series.

18. The method of claim 16, wherein I component non-data-related DC offset and the Q component non-data-related DC offset are determined in parallel.

19. The method of claim 15, flirt her comprising up converting the pair of analog current signals to produce an RF signal.

20. The method of claim 19, wherein the RF signal is an 802.11 compliant signal.

21. The method of claim 15, further comprising low pass filtering the differential analog voltage null signals and differential analog voltage signals.

* * * * *

UNITED STATES PATENT AND TRADEMARK OFFICE
CERTIFICATE OF CORRECTION

PATENT NO.         : 7,610,026 B2                                                      Page 1 of 1
APPLICATION NO.    : 11/503422
DATED              : October 27, 2009
INVENTOR(S)        : Meng-An Michael Pan It is certified that error appears in the above-identified patent and that said Letters Patent is hereby corrected as shown below:

Column 10, line 44, in Claim 19: replace "flirt her" with --further--.

Signed and Sealed this

Twelfth Day of January, 2010

David J. Kappos
*Director of the United States Patent and Trademark Office*